United States Patent
Hu et al.

(10) Patent No.: US 12,470,139 B2
(45) Date of Patent: Nov. 11, 2025

(54) CONTROL CIRCUIT WITH PEAK CURRENT LIMIT FOR SWITCHING CONVERTERS AND CONTROL METHOD THEREOF

(71) Applicant: Chengdu Monolithic Power Systems Co., Ltd., Chengdu (CN)

(72) Inventors: Wangmiao Hu, Hangzhou (CN); Lijie Jiang, Hangzhou (CN); Chiahsin Chang, Sammamish, WA (US); Jinghai Zhou, Bellevue, WA (US)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 268 days.

(21) Appl. No.: 18/325,365

(22) Filed: May 30, 2023

(65) Prior Publication Data
US 2023/0318452 A1 Oct. 5, 2023

(30) Foreign Application Priority Data
Jun. 7, 2022 (CN) .......................... 202210638756.3

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05)

(58) Field of Classification Search
CPC .. H02M 3/156; H02M 3/0009; H02M 3/1563; H02M 3/157; H02M 3/158; H02M 3/155; H02M 3/137; H02M 3/139; H02M 3/0016
See application file for complete search history.

(56) References Cited

U.S. PATENT DOCUMENTS

| | | | |
|---|---|---|---|
| 8,941,367 B2 | 1/2015 | Li et al. | |
| 9,263,876 B2 | 2/2016 | Jiang et al. | |
| 9,467,045 B2 | 10/2016 | Fogg et al. | |
| 11,063,508 B2 | 7/2021 | Lu et al. | |
| 2013/0207625 A1* | 8/2013 | Futamura | H02M 3/158 323/283 |
| 2014/0070780 A1* | 3/2014 | Yanagida | H02M 3/1588 323/271 |
| 2020/0119641 A1* | 4/2020 | Liang | H02M 3/157 |
| 2022/0247316 A1 | 8/2022 | Jiang et al. | |
| 2022/0247317 A1 | 8/2022 | Jiang et al. | |
| 2023/0134098 A1 | 5/2023 | Hu et al. | |

* cited by examiner

*Primary Examiner* — Nguyen Tran
(74) *Attorney, Agent, or Firm* — Perkins Coie LLP (57) ABSTRACT

A control circuit for a switching converter has a valley current limiting circuit, a peak current limiting circuit, an ON time control circuit, and a switching control circuit. The valley current limiting circuit provides a valley current comparison signal by comparing a current sense signal with a first current threshold. The current sense signal is representative of a current flowing through a switching circuit of the switching converter. The peak current limiting circuit provides a peak current comparison signal based on the valley current comparison signal, a switching control signal, and a second current threshold. The ON time control circuit provides an ON time control signal based on the switching control signal. The switching control circuit provides the switching control signal based on the voltage comparison signal, the valley current comparison signal, the peak current comparison signal, and the ON time control signal to control the switching circuit.

19 Claims, 6 Drawing Sheets

FIG. 7

CONTROL CIRCUIT WITH PEAK CURRENT LIMIT FOR SWITCHING CONVERTERS AND CONTROL METHOD THEREOF

CROSS-REFERENCE TO RELATED APPLICATIONS

This application claims the benefit of CN application No. 202210638756.3, filed on Jun. 7, 2022, and incorporated herein by reference.

BACKGROUND OF THE INVENTION

1. Field of the Invention

The present invention generally relates to electronic circuits, and more particularly, relates to control circuits for switching converters and control methods thereof.

2. Description of Related Art

Switching converters are widely used for converting an input voltage to an output voltage and supplying a load due to many advantages, e.g., high efficiency, high current carrying ability and so on. A switching converter comprises at least one power switch, and the output voltage is regulated at least by controlling the ON and OFF actions of the power switch. The switching converter may comprise a buck converter, a boost converter, a flyback converter and so on.

It is usually required to detect a current flowing through an output stage of the switching converter. For example, when a short condition occurs, the power switch or other components will be damaged if the current flowing through a power switch or the other components is higher than a maximum current limit. Accordingly the current is required to be detected.

SUMMARY OF THE INVENTION

Embodiments of the present invention are directed to a control circuit for a switching converter, comprising a comparison circuit, a valley current limiting circuit, a peak current limiting circuit, an ON time control circuit, and a switching control circuit. The switching converter comprises a switching circuit, and the switching circuit is turned ON and OFF by a switching control signal. The switching converter is further configured to convert an input voltage to an output voltage. The comparison circuit is configured to provide a voltage comparison signal by comparing a feedback signal with a voltage reference, wherein the feedback signal is representative of the output voltage. The valley current limiting circuit is configured to provide a valley current comparison signal by comparing a current sense signal with a first current threshold, wherein the current sense signal is representative of a current flowing through the switching circuit. The peak current limiting circuit is configured to provide an operational signal based on the valley current comparison signal and the switching control signal, and to provide a peak current comparison signal by comparing the operational signal with a second current threshold. The ON time control circuit is configured to provide an ON time control signal based on the switching control signal. The switching control circuit is configured to provide the switching control signal based on the voltage comparison signal, the valley current comparison signal, the peak current comparison signal, and the ON time control signal to turn ON and OFF the switching circuit.

Embodiments of the present invention are directed to a control circuit for a switching converter, comprising a comparison circuit, a valley current limiting circuit, a peak current limiting circuit, and a switching control circuit. The switching converter is configured to convert an input voltage to an output voltage under the control of a switching control signal. The comparison circuit is configured to provide a voltage comparison signal based on a feedback signal and a voltage reference voltage, wherein the feedback signal is representative of the output voltage. The valley current limiting circuit is configured to provide a valley current comparison signal to limit a valley value of a current flowing through the switching circuit by comparing a current sense signal with a first current threshold, wherein the current sense signal is representative of the current flowing through the switching circuit. The peak current limiting circuit is configured to provide a peak current comparison signal to limit a peak value of the current flowing through the switching circuit. The switching control circuit, configured to provide the switching control signal for turning ON and OFF the switching circuit. The switching control circuit is further configured to turn ON the switching circuit based on the voltage comparison signal and the valley current comparison signal, and the switching control circuit is configured to turn OFF the switching circuit based on the peak current comparison signal.

Embodiments of the present invention are directed to a control method for a switching converter. The switching converter comprises a switching circuit, the switching circuit is further configured to convert an input voltage to an output voltage under the control of a switching control signal. The control method comprises providing a voltage comparison signal based on the output voltage and a reference voltage, providing a valley current comparison signal by comparing a current flowing through the switching circuit with a first current threshold, providing a peak current comparison signal based on the valley current comparison signal, the switching control signal, and a second current threshold, and turning ON the switching circuit based on the voltage comparison signal and the valley current comparison signal, and turning OFF the switching circuit based on the peak current comparison signal and an ON time control signal.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
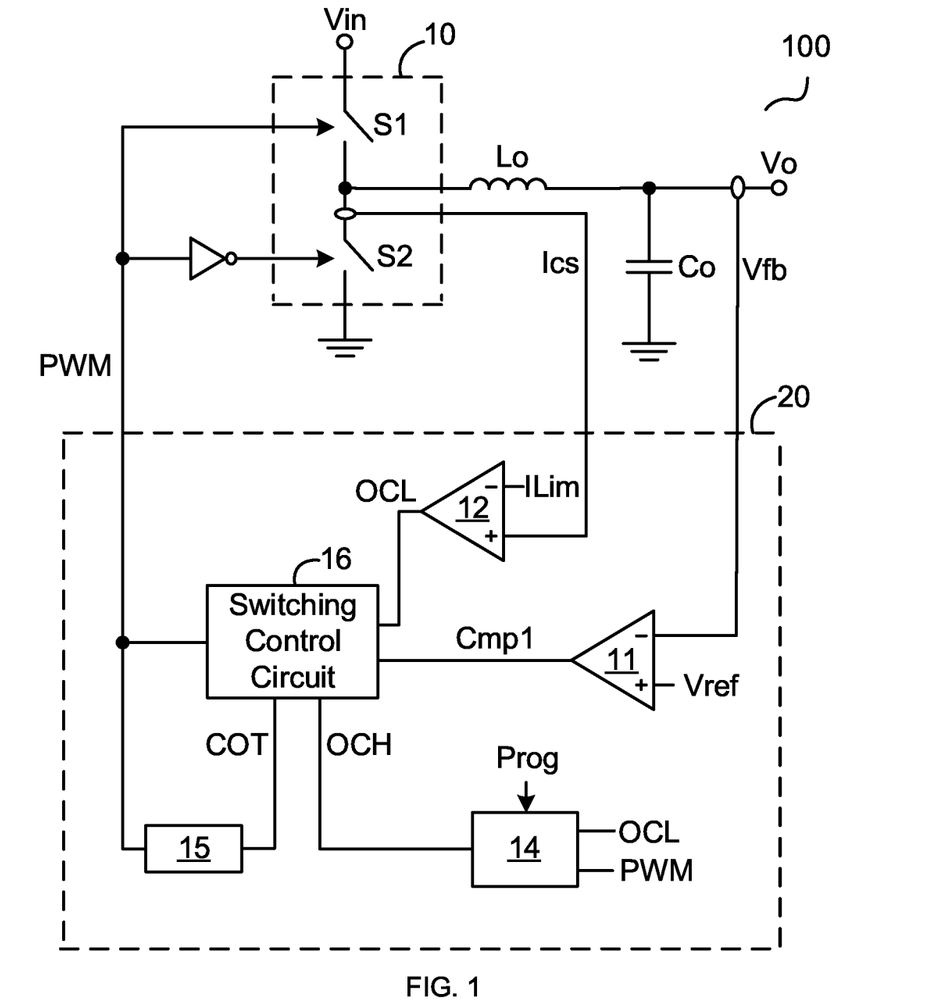
FIG. 1 schematically illustrates a switching converter 100 in accordance with an embodiment of the present invention.

FIG. 1 schematically illustrates a switching converter 100 in accordance with an embodiment of the present invention. The switching converter 100 comprises a switching circuit 10 and a control circuit 20. The switching circuit 10 is turned ON and OFF by a switching control signal PWM, and further converts an input voltage Vin to an output voltage Vo. In one embodiment, the switching circuit 10 may be a part of a buck circuit, e.g., the switching circuit 10 comprises a high side switch S1 and a low side switch S2 in the example of FIG. 1. In one embodiment, turning ON the switching circuit 10 comprises turning ON the high side switch S1, and turning OFF the switching circuit 10 comprises turning OFF the high side switch S1. One with ordinary skill in the art should understand that embodiments of the present invention are also generally applicable to other switching converter topologies. As shown in FIG. 1, the high side switch S1 has a first terminal to receive the input voltage Vin, and a second terminal. The low side switch S2 has a first terminal coupled to the second terminal of the high side switch S1, and has a second terminal coupled to a reference ground. The high side switch S1 and the low side switch S2 are turned ON and OFF complementarily by the switching control signal PWM. In one embodiment, the high side switch S1 and the low side switch S2 are transistors, e.g., metal oxide semiconductor field effect transistors (MOSFETs). In one embodiment, the switching converter 100 further comprises an inductor Lo and a capacitor Co. A first terminal of the inductor Lo is coupled to the second terminal of the high side switch S1 and the first terminal of the low side switch S2. A second terminal of the inductor Lo and a first terminal of the capacitor Co are coupled together to provide the output voltage Vo, and a second terminal of the capacitor Co is coupled to the reference ground.

The control circuit 20 comprises a comparison circuit 11, a valley current limiting circuit 12, a peak current limiting circuit 14, an ON time control circuit 15, and a switching control circuit 16. The comparison circuit 11 receives a feedback signal Vfb representative of the output voltage Vo and a reference voltage Vref, and provides a voltage comparison signal Cmp1 by comparing the feedback signal Vfb with the reference voltage Vref. In one embodiment, the comparison circuit 11 comprises a non-inverted input terminal, an inverted input terminal and an output terminal. The non-inverted input terminal of the comparison circuit 11 receives the reference voltage Vref, the inverted input terminal of the comparison circuit 11 receives the feedback signal Vfb, and the output terminal of the comparison circuit 11 provides the voltage comparison signal Cmp1. The valley current limiting circuit 12 receives a current sense signal Ics representative of a current flowing through the switching circuit 10 and a current threshold ILim, and provides a valley current comparison signal OCL by comparing the current sense signal Ics with the current threshold ILim. In some examples, the current sense signal Ics may be representative of a current flowing through the high side switch S1, the low side switch S2, or the inductor Lo. In one embodiment, the valley current limiting circuit 12 comprises a comparison circuit. The comparison circuit has a non-inverted input terminal to receive the current sense signal Ics, an inverted input terminal to receive the current threshold ILim, and an output terminal to provide the valley current comparison signal OCL. In one embodiment, the valley current comparison signal OCL is at logic high when the current sense signal Ics is larger than the current threshold ILim. In some examples, a voltage level between a high threshold voltage (e.g., 2V) and a voltage source (e.g., 3.3V) is considered as logic high ("1"), a voltage level between zero voltage (0 V) and a low threshold voltage (e.g., 1V) is considered as logic low ("0"). In one embodiment, if the switching converter 100 is not capable of directly sensing the current flowing through the high side switch S1, though the current sense signal Ics can reflect a true descending current of the inductor Lo (i.e., a decreasing current flowing through the inductor Lo), a ramping current of the inductor Lo (i.e., an increasing current flowing through the inductor Lo) can only be obtained through simulation. In this case, the valley current limiting circuit 12 is used to limit a valley value of a ripple current flowing through the inductor Lo, but is not capable of limiting a peak value of the ripple current because the current sense signal Ics does not accurately reflect the ramping current of the inductor Lo. The ripple current flowing through the inductor Lo comprises the ramping current and the descending current of the inductor Lo.

In one embodiment, the peak current limiting circuit 14 further limits the peak value of the ripple current flowing through the inductor Lo based on the valley current comparison signal OCL and the switching control signal PWM. For example, the peak current limiting circuit 14 generates an operational signal An1 based on the valley current comparison signal OCL and the switching control signal PWM, and provides a peak current comparison signal OCH by comparing the operational signal An1 with a current threshold Prog. When the operational signal An1 is larger than the current threshold Prog, which indicates that the peak value of the ripple current flowing through the inductor Lo reaches a limit, the high side switch S1 is turned OFF by the switching control signal PWM. In one embodiment, the peak current limiting circuit 14 provides the operational signal An1 by integrating a logical operation result of the switching control signal PWM and the valley current comparison signal OCL, e.g., calculating an integral of a logical AND result of the switching control signal PWM and the valley current comparison signal OCL in a continuous domain or a discrete domain. In one example, the peak current limiting circuit 14 further resets the integral based on the valley current comparison signal OCL and the switching control signal PWM.

The ON time control circuit 15 receives the switching control signal PWM and provides an ON time control signal COT based on the switching control signal PWM. In one embodiment, the ON time control circuit 15 provides the ON time control signal COT further based on the input voltage Vin to control an ON time period of the switching circuit 10 to vary with the input voltage Vin. In one embodiment, the ON time control circuit 15 provides the ON time control signal COT further based on the input voltage Vin and the output voltage Vo to control the ON time of the switching circuit 10 to vary with the input voltage Vin and the output voltage Vo.

The switching control circuit 16 provides the switching control signal PWM based on the voltage comparison signal Cmp1, the valley current comparison signal OCL, the peak current comparison signal OCH, and the ON time control signal COT. In one embodiment, the switching control circuit 16 turns ON the switching circuit 10 based on the voltage comparison signal Cmp1 and the valley current comparison signal OCL, and turns OFF the switching circuit 10 based on the peak current comparison signal OCH and the ON time control signal COT. In one embodiment, when the feedback signal Vfb is smaller than the reference voltage Vref and the current sense signal Ics is smaller than the current threshold ILim, the switching circuit 10 is turned ON by the switching control signal PWM, e.g., the switching control signal PWM is set at logic high. In one embodiment, when the ON time period of the switching circuit 10 (e.g., an ON time period of the high side switch S1) reaches a time period TON preset by the ON time control signal COT or when an active duration of the operational signal An1 is larger than the current threshold Prog, the switching circuit 10 is turned OFF by the switching control signal PWM.

Figure 2A:
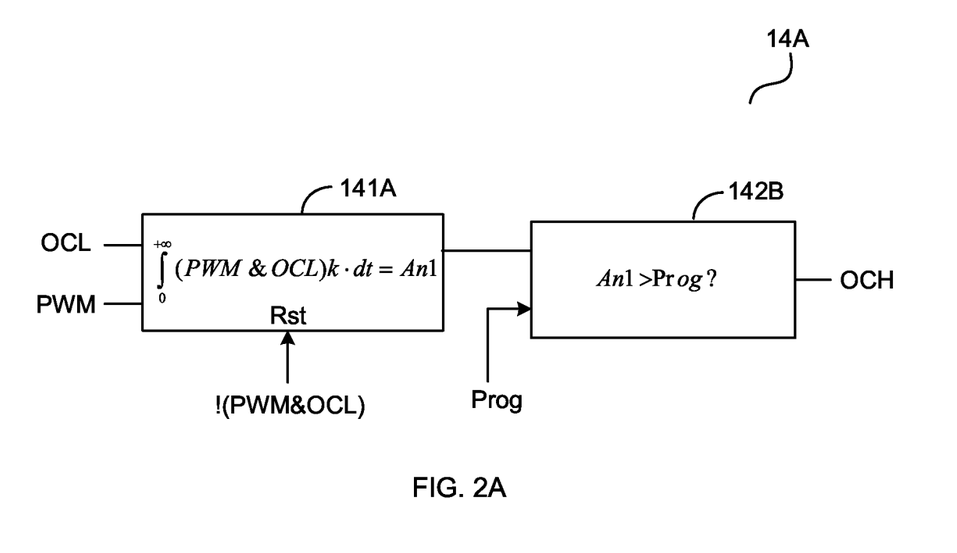
FIG. 2A schematically illustrates a peak current limiting circuit 14A in accordance with an embodiment of the present invention.

FIG. 2A schematically illustrates a peak current limiting circuit 14A for calculating the integral in the continuous domain in accordance with an embodiment of the present invention. In the example of FIG. 2A, the peak current limiting circuit 14A comprises an integral unit 141A and a comparison unit 142A. The integral unit 141A receives the switching control signal PWM and the valley current comparison signal OCL, and provides the operational signal An1 by integrating the logical AND result of the switching control signal PWM and the valley current comparison signal OCL. For example, the operational signal An1 is calculated based on a following formula (1), wherein "k" is a coefficient:

$$An1 = \int_0^{+\infty} (PWM \& OCL) k \cdot dt \qquad (1)$$

One with ordinary skill in the art should understand that the logical operation of the switching control signal PWM and the valley current comparison signal OCL is not limited to the logical AND, and may also comprise any other suitable logical operations which are not departed from the spirit and the scope of the present invention.

In one embodiment, the integral unit 141A is further reset based on the logical AND result of the valley current comparison signal OCL and the switching control signal PWM. For example, the integral unit 141A is reset when the logical AND result of the valley current comparison signal OCL and the switching control signal PWM is logic low. The comparison unit 142A receives the operational signal An1 and the current threshold Prog, and provides the peak current comparison signal OCH by comparing the operational signal An1 with the current threshold Prog.

Figure 2B:
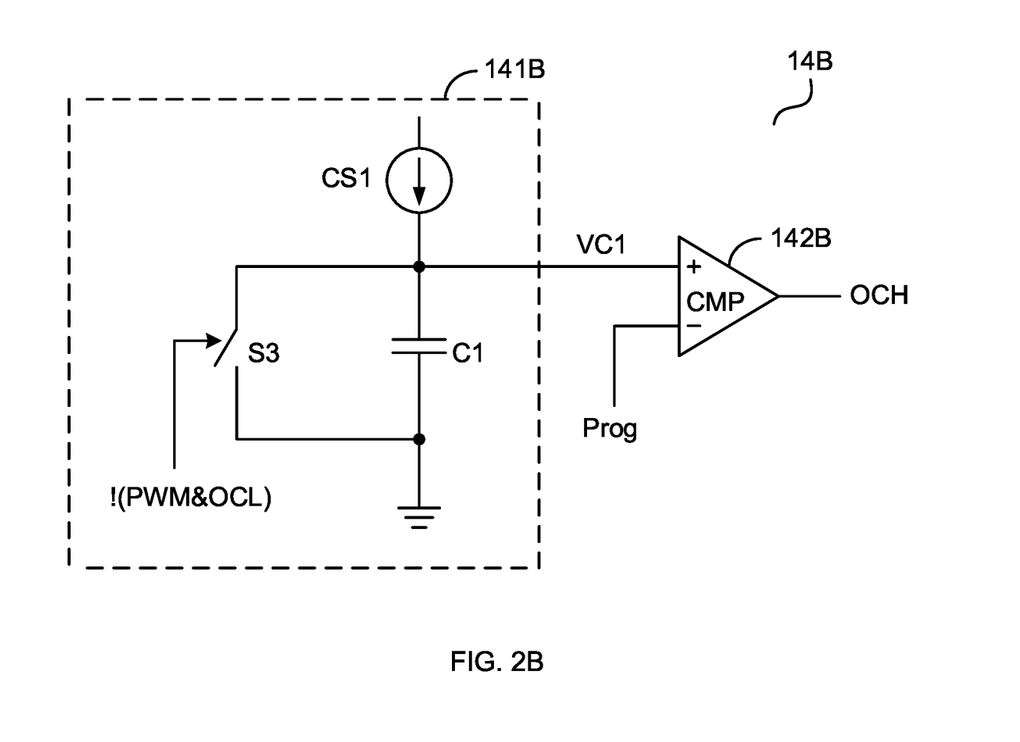
FIG. 2B schematically illustrates a circuit diagram of a peak current limiting circuit 14B in accordance with an embodiment of the present invention.

FIG. 2B schematically illustrates a circuit diagram of a peak current limiting circuit 14B for calculating the integral in the continuous domain in accordance with an embodiment of the present invention. In the example of FIG. 2B, an integral unit 141B comprises a current source CS1, a capacitor C1, and a switch S3. The switch S3 is turned ON and OFF under the control of the switching control signal PWM and the valley current comparison signal OCL. A comparison unit 142B comprises a comparator CMP. The comparator CMP has a non-inverted input terminal to receive a voltage VC1 developed across the capacitor C1, an inverted input terminal to receive the current threshold Prog, and an output terminal to provide the peak current comparison signal OCH by comparing the voltage VC1 with the current threshold Prog.

In one embodiment, when the logical AND result of the switching control signal PWM and the valley current comparison signal OCL (i.e., PWM&OCL) is at logic high, the switch S3 is turned OFF, the current source CS1 charges the capacitor C1, and the voltage VC1 increases. Until the voltage VC1 increases to be larger than the current threshold Prog, the peak current comparison signal OCH transits to be at logic high, and the high side switch S1 is turned OFF. In one embodiment, when the logical AND result of the switching control signal PWM and the valley current comparison signal OCL (i.e., PWM&OCL) is at logic low, the switch S3 is turned ON, the capacitor C1 discharges rapidly, and the voltage VC1 decreases to be 0V.

Figure 3A:
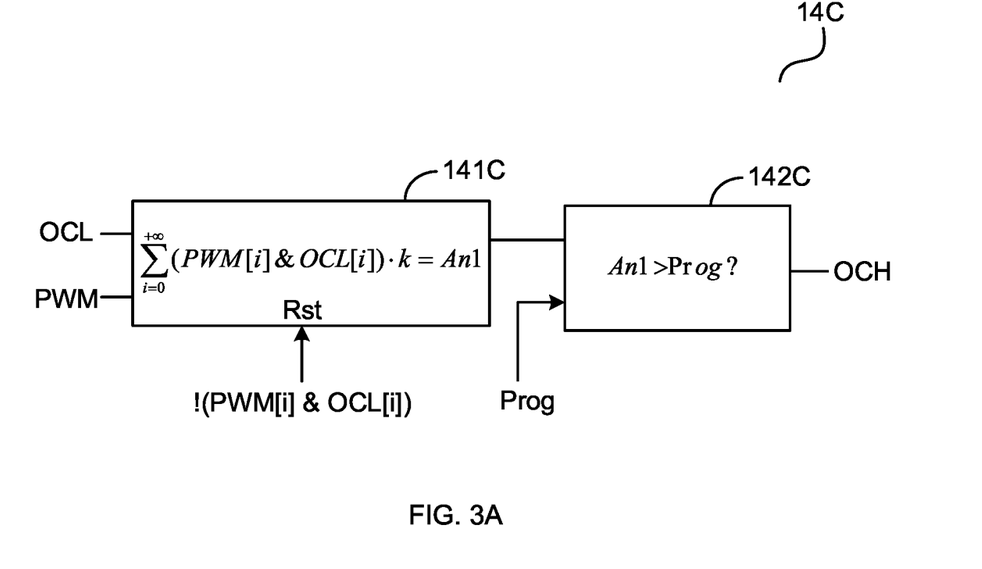
FIG. 3A schematically illustrates a peak current limiting circuit 14C in accordance with an embodiment of the present invention.

FIG. 3A schematically illustrates a peak current limiting circuit 14C for calculating the integral in the discrete domain in accordance with an embodiment of the present invention. As shown in FIG. 3A, an integral unit 141C operates in the discrete domain, and the operational signal An1 is calculated based on a following formula (2):

$$\sum_{i=0}^{+\infty} (PWM[i] \& OCL[i]) \cdot k = An1 \qquad (2)$$

Figure 3B:
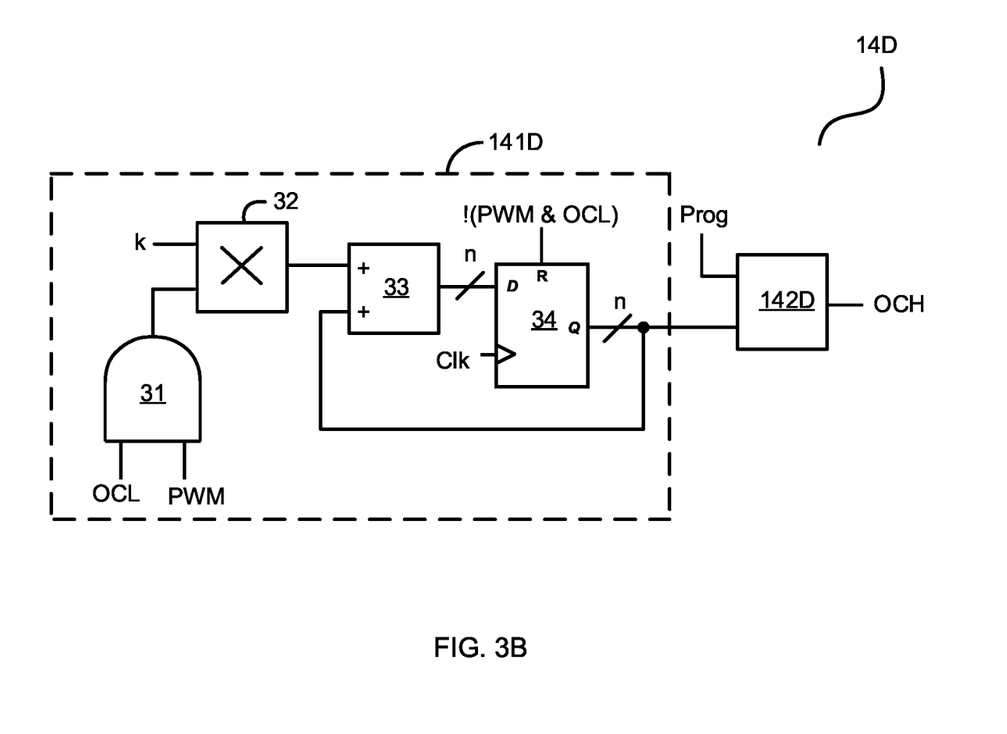
FIG. 3B schematically illustrates a circuit diagram of a peak current limiting circuit 14D in accordance with an embodiment of the present invention.

FIG. 3B schematically illustrates a circuit diagram of a peak current limiting circuit 14D for calculating the integral in the discrete domain in accordance with an embodiment of the present invention. In the example of FIG. 3B, an integral unit 141D comprises an AND gate 31, a multiplication unit 32, an adder 33, and an n-bit D flip-flop 34. The AND gate 31 provides an AND signal A1 based on the switching control signal PWM and the valley current comparison signal OCL. The multiplication unit 32 provides a multiplication signal M1 by multiplying the AND signal A1 and the coefficient k. For example, the multiplication unit 32 may be realized using a look-up table or adders. The adder 33 provides an n-bit cumulative signal A2 to the n-bit D flip-flop 34 based on a sum of the multiplication signal M1 and the operational signal An1, and the n-bit D flip-flop 34 provides the operational signal Ant based on the n-bit cumulative signal A2. In one example, the operational signal An1 may comprise an n-bit digital signal (i.e., may be an n-bit operational signal An1). In one embodiment, the n-bit D flip-flop 34 resets based on the logical AND result of the switching control signal PWM and the valley current comparison signal OCL (i.e., PWM&OCL). For example, when an inverted signal of the logical AND result of the switching control signal PWM and the valley current comparison signal OCL (i.e., PWM&OCL) is at logic high, the n-bit D flip-flop 34 resets and the operational signal An1 is reset to be zero. A comparison unit 142D receives the n-bit operational signal An1, and provides the peak current comparison signal OCH by comparing the n-bit operational signal An1 with the current threshold Prog. In one embodiment, the current threshold Prog is a digital signal.

Figure 4:
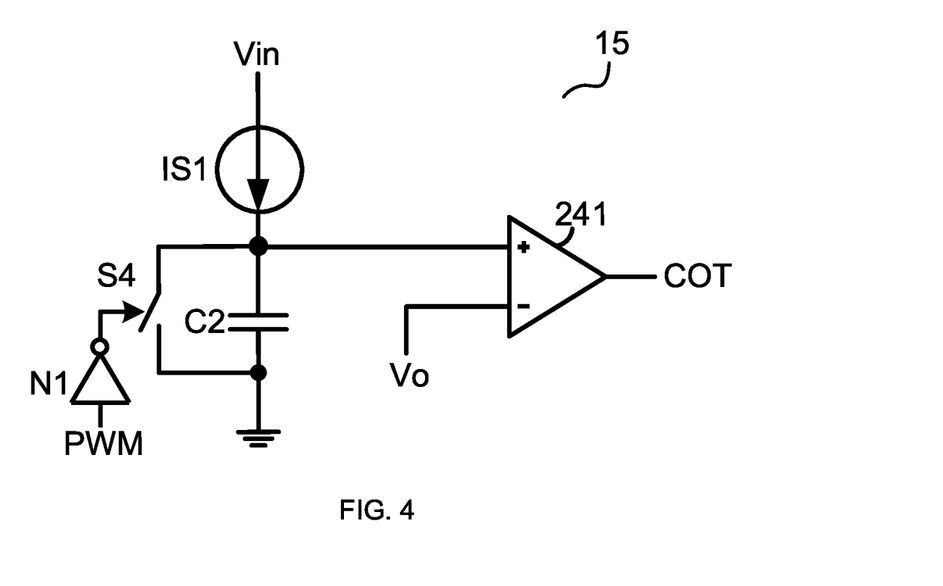
FIG. 4 schematically illustrates an ON time control circuit 15 in accordance with an embodiment of the present invention.

FIG. 4 schematically illustrates the ON time control circuit 15 in accordance with an embodiment of the present invention. As shown in FIG. 4, the ON time control circuit 15 receives the input voltage Vin, the output voltage Vo and the switching control signal PWM, and provides the ON time control signal COT. One with ordinary skill in the art should understand that the detailed circuit structure of the ON time control circuit 15 is not limited by the example shown in FIG. 4. In the example of FIG. 4, the ON time control circuit 15 comprises a current source IS1, a capacitor C2, a switch S4, and a comparison circuit 241. The current source IS1 has a first terminal to receive the input voltage Vin and a second terminal coupled to a first terminal of the capacitor C2, and a second terminal of the capacitor C2 is coupled to the reference ground. The current source IS1 generates a charge current to charge the capacitor C2 under the control of the input voltage Vin. In one embodiment, the charge current varies with the input voltage Vin, e.g., increases with the increase of the input voltage Vin, and decreases with the decrease of the input voltage Vin. The switch S4 has a first terminal, a second terminal, and a control terminal. The first terminal of the switch S4 is coupled to a common node of the capacitor C2 and the current source IS1, the second terminal of the switch S4 is coupled to the second terminal of the capacitor C2, and the control terminal of the switch S4 receives the switching control signal PWM via a NOT gate N1. In one embodiment, when the switching control signal PWM is active (e.g., at logic high), the switch S4 is turned OFF, and the current source IS1 charges the capacitor C2, which increases a voltage across the capacitor C2, and when the switching control signal PWM is inactive (e.g., at logic low), the switch S4 is turned ON, and the capacitor C2 discharges via the switch S4, which decreases the voltage across the capacitor C2. In one embodiment, a voltage Vs developed at the common node of the capacitor C2 and the current source IS1 represents the voltage across the capacitor C2. A non-inverted input terminal of the comparison circuit 241 receives the voltage across the capacitor C2 (i.e., the voltage Vs), an inverted input terminal of the comparison circuit 241 receives the output voltage Vo, and the comparison circuit 241 provides the ON time control signal COT by comparing the voltage Vs with the output voltage Vo.

Figure 5:
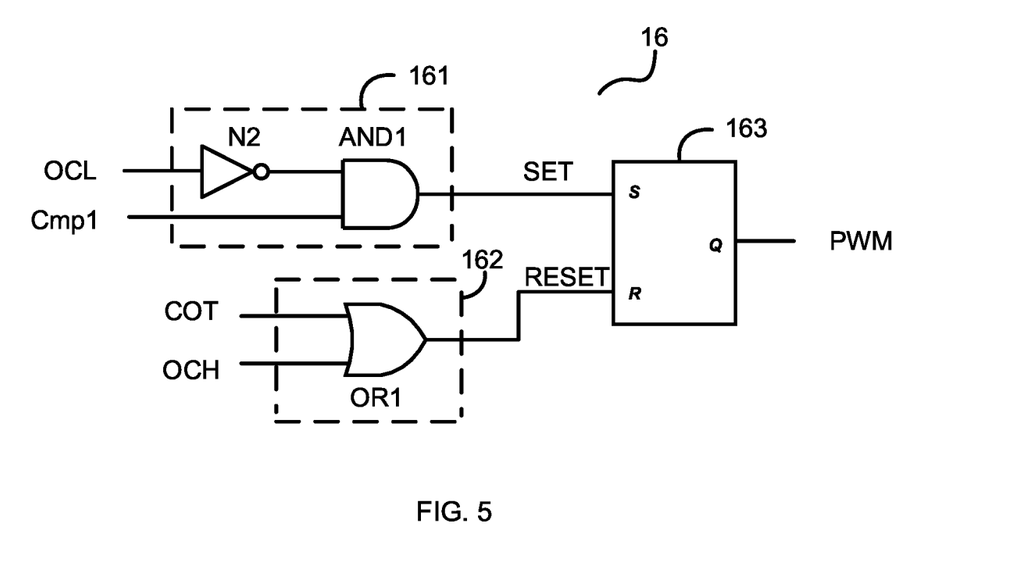
FIG. 5 schematically illustrates a switching control circuit 16 in accordance with an embodiment of the present invention.

FIG. 5 schematically illustrates the switching control circuit 16 in accordance with an embodiment of the present invention. One with ordinary skill in the art should understand that the detailed circuit structure of the switching control circuit 16 is not limited by the example shown in FIG. 5. As shown in FIG. 5, the switching control circuit 16 comprises a logic circuit 161, a logic circuit 162, and a logic circuit 163. The logic circuit 161 receives the voltage comparison signal Cmp1 and the valley current comparison signal OCL, and provides a set signal SET based on the voltage comparison signal Cmp1 and the valley current comparison signal OCL. The logic circuit 162 receives the peak current comparison signal OCH and the ON time control circuit COT, and provides a reset signal RESET based on the peak current comparison signal OCH and the ON time control circuit COT. The logic circuit 163 receives the set signal SET and the reset signal RESET, and provides the switching control signal PWM based on the set signal SET and the reset signal RESET. In one embodiment, the logic circuit 161 comprises a NOT gate N2 and an AND gate AND1. The NOT gate N2 receives the valley current comparison signal OCL. The AND gate AND1 comprises a first input terminal, a second input terminal, and an output terminal. The first input terminal of the AND gate AND1 is coupled to an output terminal of the NOT gate N2 to receive an inverted signal of the valley current comparison signal OCL, the second input terminal of the AND gate AND1 receives the voltage comparison signal Cmp1, and the output terminal of the AND gate AND1 provides the set signal SET. In one embodiment, the logic circuit 162 comprises an OR gate OR1. The OR gate OR1 comprises a first input terminal to receive the ON time control circuit COT, a second input terminal to receive the peak current comparison signal OCH, and an output terminal to provide the reset signal RESET. In one embodiment, the logic circuit 163 comprises an RS flip-flop. The RS flip-flop comprises a set terminal S, a reset terminal R, and an output terminal Q. The set terminal S receives the set signal SET, the reset terminal R receives the reset signal RESET, and the output terminal Q provides the switching control signal PWM.

Figure 6:
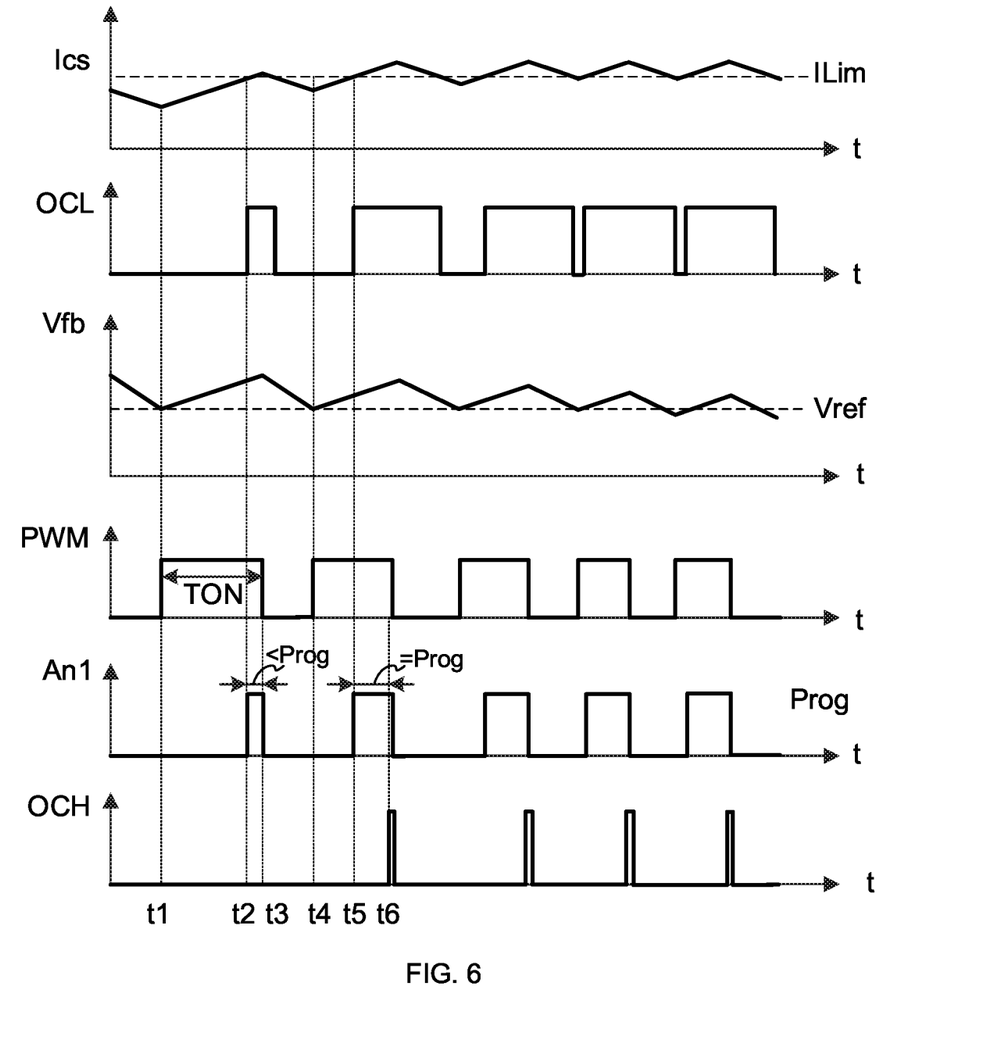
FIG. 6 shows waveforms of the switching converter 100 in accordance with an embodiment of the present invention.

FIG. 6 shows waveforms of the switching converter 100 in accordance with an embodiment of the present invention. In FIG. 6, from top to bottom are waveforms of the current sense signal Ics, the valley current comparison signal OCL, the feedback signal Vfb, the switching control signal PWM, the operational signal An1, and the peak current comparison signal OCH.

At a time t1, the feedback signal Vfb decreases to be smaller than the reference voltage Vref, and the current sense signal Ics is smaller than the current threshold ILim, the logic state of the switching control signal PWM flips from a first status to a second status (e.g. from logic low to logic high) to turn ON the switching circuit 10, e.g., turn the high side switch S1 ON and turn the low side switch S2 OFF, which indicates a switching cycle starts. At a time t2, the current sense signal Ics is larger than the current threshold ILim, and the logic status of the valley current comparison signal OCL flips. The switching control signal PWM is still in the second status (e.g. still at logic high) at the time t2, and the operational signal An1 flips to be at logic high. At a time t3, the ON time period of the switching circuit 10 reaches the time period TON, the logic state of the switching control signal PWM flips to the first status (e.g., logic low) to turn OFF the switching circuit 10, e.g., turn the high side switch S1 OFF and turn the low side switch S2 ON, and the operational signal An1 flips to be at logic low. In the current switching cycle, the active duration of the operational signal An1 (e.g., a duration of the operational signal An1 at logic high) is smaller than the current threshold Prog, the logic status of the peak current comparison signal OCH maintains, and the peak current limiting circuit 14 does not limit the ripple current flowing through the inductor Lo. At a time t4, the feedback signal Vfb decreases to be smaller than the reference voltage Vref and the current sense signal Ics is smaller than the current threshold ILim, the logic state of the switching control signal PWM flips from the first status to the second status to turn ON the switching circuit 10, which indicates that the switching converter 100 enters a new switching cycle. At a time t5, the current sense signal Ics is larger than the current threshold ILim, the valley current comparison signal OCL flips and the operational signal An1 transits to be at logic high. At a time t6, the active duration of the operational signal An1 reaches the current threshold Prog, the logic status of the peak current comparison signal OCH flips (e.g. to be at logic high), the logic status of the switching control signal PWM flips to the second status (e.g., logic low), and the switching circuit 10 is turned OFF.

Figure 7:
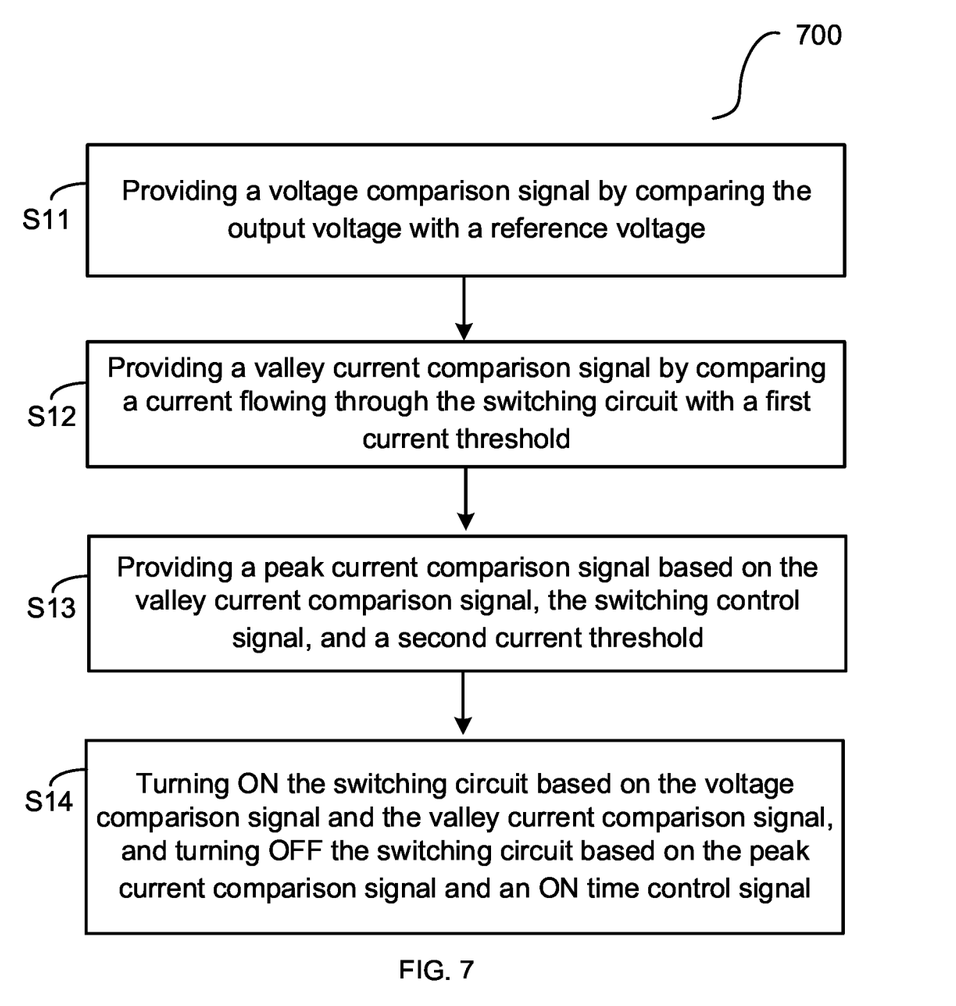
FIG. 7 illustrates a control method 700 for a switching converter in accordance with an embodiment of the present invention.

FIG. 7 illustrates a control method 700 for a switching converter in accordance with an embodiment of the present invention. The switching converter comprises a switching circuit for converting an input voltage to an output voltage under the control of a switching control signal. The control method 700 comprises steps S11~S14.

In step S11, providing a voltage comparison signal by comparing the output voltage with a reference voltage.

In step S12, providing a valley current comparison signal by comparing a current flowing through the switching circuit with a first current threshold.

In step S13, providing a peak current comparison signal based on the valley current comparison signal, the switching control signal, and a second current threshold.

In step S14, turning ON the switching circuit based on the voltage comparison signal and the valley current comparison signal, and turning OFF the switching circuit based on the peak current comparison signal and an ON time control signal.

In one embodiment, the control method 700 further comprises providing an operational signal by integrating the switching control signal and the valley current comparison signal, and providing the peak current comparison signal by comparing the operational signal with the second current threshold. In one embodiment, when the operational signal is larger than the second current threshold, the switching circuit is turned OFF by the switching control signal.

Note that in the control method described above, the functions indicated in the boxes can also occur in a different order than those shown in FIG. 7. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A control circuit for a switching converter, wherein the switching converter comprises a switching circuit, the switching circuit is turned ON and OFF by a switching control signal, and is further configured to convert an input voltage to an output voltage, the control circuit comprising:
   a comparison circuit, configured to provide a voltage comparison signal by comparing a feedback signal with a voltage reference, wherein the feedback signal is representative of the output voltage;
   a valley current limiting circuit, configured to provide a valley current comparison signal by comparing a current sense signal with a first current threshold, wherein the current sense signal is representative of a current flowing through the switching circuit;
   a peak current limiting circuit, configured to provide an operational signal based on the valley current comparison signal and the switching control signal, and to provide a peak current comparison signal by comparing the operational signal with a second current threshold;
   an ON time control circuit, configured to provide an ON time control signal based on the switching control signal; and
   a switching control circuit, configured to provide the switching control signal based on the voltage comparison signal, the valley current comparison signal, the peak current comparison signal, and the ON time control signal to turn ON and OFF the switching circuit.

2. The control circuit of claim 1, wherein the peak current limiting circuit is further configured to provide the operational signal by integrating the switching control signal and the valley current comparison signal.

3. The control circuit of claim 1, wherein the peak current limiting circuit comprises:
   an integral unit, configured to receive the switching control signal and the valley current comparison signal, and to provide the operational signal based on the switching control signal and the valley current comparison signal; and
   a comparison unit, configured to receive the operational signal and the second current threshold, and is further configured to compare an active duration of the operational signal with the second current threshold, wherein the peak current comparison signal transits from a first logic status to a second logic status in response to the active duration of the operational signal reaching the second current threshold.

4. The control circuit of claim 1, wherein the switching control circuit is further configured to turn ON the switching circuit based on the voltage comparison signal and the valley current comparison signal, and to turn OFF the switching circuit based on the peak current comparison signal and the ON time control signal.

5. The control circuit of claim 1, wherein the switching circuit is turned ON by the switching control signal in response to the feedback signal being smaller than the reference voltage and the current sense signal being smaller than the first current threshold.

6. The control circuit of claim 1, wherein the peak current limiting circuit is further configured to provide the operational signal by integrating the switching control signal and the valley current comparison signal, and the switching circuit is turned OFF by the switching control signal in response to the operational signal being larger than the second current threshold.

7. A control circuit for a switching converter, wherein the switching converter is configured to convert an input voltage to an output voltage under the control of a switching control signal, the control circuit comprising:
   a comparison circuit, configured to provide a voltage comparison signal based on a feedback signal and a voltage reference voltage, wherein the feedback signal is representative of the output voltage;

a valley current limiting circuit, configured to provide a valley current comparison signal to limit a valley value of a current flowing through the switching circuit by comparing a current sense signal with a first current threshold, wherein the current sense signal is representative of the current flowing through the switching circuit;

a peak current limiting circuit, configured to provide a peak current comparison signal to limit a peak value of the current flowing through the switching circuit; and a switching control circuit, configured to provide the switching control signal for turning ON and OFF the switching circuit; wherein the switching control circuit is configured to turn ON the switching circuit based on the voltage comparison signal and the valley current comparison signal, and the switching control circuit is configured to turn OFF the switching circuit based on the peak current comparison signal.

8. The control circuit of claim 7, wherein the peak current limiting circuit is further configured to provide an operational signal by comparing an operational signal with a second current threshold, wherein the operational signal is generated based on the valley current comparison signal and the switching control signal.

9. The control circuit of claim 8, wherein the peak current limiting circuit is further configured to provide the operational signal by integrating the switching control signal and the valley current comparison signal.

10. The control circuit of claim 7, wherein the peak current limiting circuit comprises:
an integral unit, configured to receive the switching control signal and the valley current comparison signal, and to provide an operational signal based on the switching control signal and the valley current comparison signal; and
a comparison unit, configured to receive the operational signal and the second current threshold, and is further configured to compare an active duration of the operational signal with the second current threshold, wherein the peak current comparison signal transits from a first logic status to a second logic status in response to the active duration of the operational signal reaching the second current threshold.

11. The control circuit of claim 7, wherein the switching circuit is turned ON by the switching control signal in response to the feedback signal being smaller than the reference voltage and the current sense signal being smaller than the first current threshold.

12. The control circuit of claim 7, wherein the peak current limiting circuit is further configured to provide an integral by integrating the switching control signal and the valley current comparison signal, and the switching circuit is turned OFF by the switching control signal in response to the integral being larger than the second current threshold.

13. The control circuit of claim 7, further comprising:
an ON time control circuit, configured to provide an ON time control signal based on the switching control signal; wherein
the switching control circuit is configured to turn OFF the switching circuit further based on the ON time control signal.

14. The control circuit of claim 13, wherein the ON time control circuit is configured to provide the ON time control signal further based on at least one of the input voltage and the output voltage.

15. The control circuit of claim 7, wherein the switching control circuit comprises:
a second logic circuit, configured to receive the voltage comparison signal and the valley current comparison signal, and provide a set signal based on the voltage comparison signal and the valley current comparison signal; and
a third logic circuit, configured to receive the peak current comparison signal and an ON time control signal, and provide a reset signal based on the peak current comparison signal and the ON time control signal; wherein
the switching control circuit is configured to provide the switching control signal based on the set signal and the reset signal.

16. A control method for a switching converter, wherein the switching converter comprises a switching circuit, the switching circuit is further configured to convert an input voltage to an output voltage under the control of a switching control signal, the control method comprising:
providing a voltage comparison signal based on the output voltage and a reference voltage;
providing a valley current comparison signal by comparing a current flowing through the switching circuit with a first current threshold;
providing a peak current comparison signal based on the valley current comparison signal, the switching control signal, and a second current threshold; and
turning ON the switching circuit based on the voltage comparison signal and the valley current comparison signal, and turning OFF the switching circuit based on the peak current comparison signal and an ON time control signal.

17. The control method of claim 16, further comprising:
providing an integral by integrating the switching control signal and the valley current comparison signal, and providing the peak current comparison signal by comparing the integral with the second current threshold.

18. The control method of claim 16, further comprising:
providing an integral by integrating the switching control signal and the valley current comparison signal, and the switching circuit is turned OFF by the switching control signal in response to the integral increasing to the second current threshold.

19. The control method of claim 16, further comprising:
providing the ON time control signal based on the switching control signal.

* * * * *